(12) United States Patent
Rolenz

(10) Patent No.: US 7,526,206 B1
(45) Date of Patent: Apr. 28, 2009

(54) LASER COMMUNICATIONS CROSSLINK SYSTEM

(75) Inventor: Michael A. Rolenz, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/577,221

(22) Filed: May 23, 2000

(51) Int. Cl.
    *H04B 10/00* (2006.01)
(52) U.S. Cl. .................. 398/140; 398/141; 398/183; 398/189
(58) Field of Classification Search .......... 375/247; 341/143; 359/180, 181; 398/140, 154, 155, 398/183, 189–191, 118
See application file for complete search history.

(56) References Cited

U.S. PATENT DOCUMENTS

| | | | | |
|---|---|---|---|---|
| 5,287,107 A | * | 2/1994 | Gampell et al. ............ | 341/137 |
| 5,465,270 A | * | 11/1995 | Beauducel et al. .......... | 375/242 |
| 5,483,371 A | * | 1/1996 | Farinelli, Jr. .............. | 398/112 |
| 5,565,867 A | * | 10/1996 | Tiemann ................... | 341/143 |
| 5,921,921 A | * | 7/1999 | Potratz et al. .............. | 600/323 |
| 6,069,722 A | * | 5/2000 | Schlag ..................... | 398/183 |
| 6,140,952 A | * | 10/2000 | Gaboury ................... | 341/143 |
| 6,141,132 A | * | 10/2000 | Palmer et al. .............. | 398/183 |
| 6,385,235 B1 | * | 5/2002 | Scott et al. ................ | 375/220 |

\* cited by examiner

*Primary Examiner*—Agustin Bello
(74) *Attorney, Agent, or Firm*—Derrick Michael Reid

(57) ABSTRACT

A laser communication crosslink system employs an $n^{th}$ order sigma delta modulator with a laser transmitter for communicating an analog input signal in binary form as a pulse width modulated signal, and employs a digital filter with a receiver for providing a digital output signal representing the value of the analog input signal. The pulse width modulated laser signal is communicated between the transmitter and receiver over a laser crosslink that may be fiber optic. The direct modulation using the sigma delta modulator with the transmitter and using the digital filter with the receiver reduces system complexity and power consumption.

18 Claims, 2 Drawing Sheets

LASER COMMUNICATION CROSSLINK SYSTEM

FIRST ORDER SIGMA DELTA MODULATOR (PRIOR ART)

SECOND ORDER SIGMA DELTA MODULATOR (PRIOR ART)

LASER COMMUNICATION CROSSLINK SYSTEM

LASER COMMUNICATIONS CROSSLINK SYSTEM

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of communications. More particularly, the present invention relates to laser satellite crosslink or fiber optics communication channels.

BACKGROUND OF THE INVENTION

Transmitters and receivers have long been used to communicate communication signals over a communication channel such as a unidirectional crosslink. The transmitter receives an analog input signal that is converted into digital form using a digital to analog converter providing a parallel output that is then converted into a serial data stream using a parallel to serial converter. The serial data bits stream is expanded to include frame synchronization words and forward error correction bits prior to transmission over the communications crosslink. The communicated signal is received by a receiver that performs forward error correction. The synchronization is achieved during removal of the frame synchronization words. The serial data stream is then converted into a parallel data stream using a serial to parallel converted. The parallel data stream can then be input into a digital to analog converter for providing the original analog input signal.

On the transmitter side of the communication channel, the analog signal has a baseband bandwidth of +/−f and is converted to n bit data words by the analog to digital converter at a sampling rate exceeding the Nyquist rate of 2f samples per second. These n bit data words are parallel data bit signals that are converted into a serial bit stream at a rate of 2fn bps. To determine the ordering of the least to most significant bits of the data words in the serial bit stream, unique and easily identifiable synchronization frame words are periodically inserted into the serial data stream. These synchronization frames words are overhead data and are typically one to ten percent of the informational data words. This overhead data increases the required rate of bits transmitted per second to (2fn(1+s/100)bps where s is the percentage of the serial bit stream associated with synchronization frame words. To accomplish the communications at the original data bit, the serial stream including the frame words and redundant error correction bits must be reclocked to a higher data rate having a shorter bit duration time. In order to maintain the data rate of the data words when the serial bit stream has additional synchronization frame words, the serial bit stream will be clocked at a higher rate. The received data stream must also therefore be coherently reclocked to recover the original data. Non-integer multiples of the transmitted data require frequency synthesizers and other digital word buffers.

Frame synchronization words are added to separate the groups of data words into frames of data words. Redundant error correction bits are also added at a particular code rate that relates the number of information data bits to the total number of communicated bits. Forward error correction redundant bits are added at a predetermined code rate to the data stream to correct for transmission errors. The forward error correction increases the actual data rate to 2fn(1+s/100)/r where r is the code rate. The data stream is then transmitted over the communication channel. Hence, the traditional approach to transmitting digitized signal information over a crosslink is to multiplex the parallel output of the analog to digital converter into an ordered serial data stream synchronized by added synchronization frame word and adding redundant error correction bits into the bit stream.

At the receiver side of the communication channel, the received incoming signal is processed in reverse order of the processing of the data on the transmit side. Forward error correction first corrects for transmission error while removing the redundant error correction bits. Frame synchronization is performed to determine the significance of the bits during which the frame synchronization words are removed from the data stream and the data is reclocked into a serial bit stream having a bit time duration equal to the bit time during of the serial data stream prior to frame synchronization in the transmitter. The serial data stream is then converted back into the original n bit parallel data words by sampling the serial data stream at the bit time duration and clocking the serial bit stream into a serial to parallel converter. The parallel data words for the serial to parallel converter are then input into a digital to analog converter for providing the original analog signal when an analog signal output is desirable.

It is desirable to eliminate the synchronization and forward error correction so as to reduce that total amount of data bits transmitted for improved channel communication efficiency. It also desirable to eliminate reclocking of the serial data streams in both transmitter and receiver reducing system complexity. One problem with conventional communications crosslink is the transmission of synchronization frame words and redundant error correction data bits. Another problem with conventional communications crosslinks is the power required for the additional hardware needed to reclock the data streams at higher data rate that further serves to decrease bandwidth efficiency.

The communication channel may be laser crosslink. The laser crosslink may not transmit analog signals directly with high power efficiency. Analog signals must be converted to digital samples and the bits transmitted must modulate the laser beam using digital modulation, for example, phase shift keying or on off keying. Small satellites, such as nanosatellites, are not able to generate much power because of the small solar power collection area. The use of laser crosslinks is desirable for transferring large amount of data to another satellite for data processing. Low power consumption components, and a reduction of the number of components are required to meet power limited resources. The reduction of the numbers of component is also desirable to increase reliability and reduce fabrication complexity. One problem with conventional crosslinks is the increased complexity for enabling frame synchronization and forward error correction. Another problem with laser crosslinks transmitting data streams is required additional components for reclocking that complicate the crosslink design as well as dissipating more power from the already power limited resources.

Referring to FIGS. 1A and 1B, first and second order modulators have been used to modulate an analog input signal 10 into a modulated output 12. The output 12 is a binary output. In the first order sigma delta modulator of FIG. 1A, the input signal is fed into a summer 14 providing an input error signal that is fed into an integrated 16. The input error signal from the summer 14 is integrated by the integrator 16 to form an accumulated error signal that becomes an input to a one bit quantizer 18. The output of the one bit quantizer 18 is the binary output 12 and is the sign of accumulated error signal. The output of the quantizer 18 is fed into the DAC 20 providing a converted error equal to a gain amplifier 22. A gain amplifier 22 provides gain G of the converted error signal from output of the DAC 20 to provide an amplified error signal to the summer 14. The amplified error signal output of the gain amplifier 22 is fed back into the summer 14 to be subtracted from the analog input signal 10 to provide an input error signal. Hence, the first order modulator comprises a first order feedback loop. The first order feedback loop forces the average of the converted error signal output of the DAC 20 to be equal to the analog input signal 10 plus an error signal. The output of the first order modulator 12 is a series of +1 or −1 pulses of varying duration. The second order modulator of FIG. 1B, comprises a first order feedback loop and a second order feedback loop. The second order feedback loop comprises a summer 14a, integrator 16a, the one bit quantizer 18, a DAC 20a, and a gain amplifier 22a, whereas the first order feedback loop comprises a summer 14b, integrator 16b, the one bit quantizer 18, a DAC 20b, and a gain amplifier 22b. The first order feedback loop serves to generate a first order input error signal at summer 14b, while the second order feedback loop serves to generate a second order input error signal of first order input error signal. The presence of a second order feedback loop reduces the magnitude of the overall error at the binary output 12. The binary output 12 of the sigma delta modulator is a series of pulses of +1 or −1 of varying duration. Hence, the sigma delta modulators convert the analog input 10 into the binary output 12. The sigma delta modulators have been used as modulators for digital communications, and as part of an analog to digital converter. These sigma delta modulators have been used in analog to digital converters comprising a sigma delta modulator and a digital filter. These sigma delta modulators have also been used as opposing modulators and demodulators in communication links for communicating an analog signal by transmitting a binary communication signal through the crosslink. In the sigma delta analog-to-digital converter, the sigma delta modulator and digital interpolating filter are an integrated package. While sigma delta modulators offer analog signal modulation, these modulators have not been used for laser crosslink communication where digital signal samples rather than analog samples are desired. These and other disadvantages are solved or reduced using the invention.

SUMMARY OF THE INVENTION

An object of the invention is to provide a laser crosslink communicating a binary signal using sigma delta modulation prior to transmission and digital filtering after reception.

Another object of the invention is to provide a laser crosslink for communicating a binary signal using sigma delta modulation prior to transmission and digital filtering after reception for generating a digital signal representative of the analog input signal.

The present invention is directed to a laser crosslink system between a transmitter and a receiver. An analog input to modulated by a sigma delta modulator providing a symbol data stream to a laser transmitter transmitting a binary communication signal. The binary communication signal is received by a laser receiver providing a symbol data stream to a digital filter that provides a digital output. Hence, the present invention is directed to communicating in binary form an analog signal using a sigma delta modulator and recovering a digital samples of the analog signal using a digital filter. The combination of the sigma delta modulator with the transmitter and the digital filter with the receiver enabling direct laser modulation of the binary signals communicated across the laser link.

The laser crosslink system requires fewer parts and less power by integrating analog to digital conversion and transmission into one system. The use of sigma delta modulator prior to transmission reduces the roll-off requirements for anti-aliasing filters in the front of the analog to digital converter of the satellite transmitting the crosslink signal reducing manufacturing tolerances and required performance. The sigma-delta modulator simplifies laser crosslink design over traditional phase shift keying modulation by direct modulation of the laser by the data stream.

Sigma-delta modulator is a conventional sigma delta modulator providing a binary +/−1 output for providing on-off (0,1) signal that is then fed directly into an on-off laser modulator providing a binary communication signal. When the output of the laser detector is a continuous voltage rather than a 0 or 1, then this may be converted to an n-bit digital word between [−1,1] to implement soft decision type of algorithms for the interpolation function. The laser is used in a transmitter communicating through the laser communication crosslink to another receiving satellite. The receiving satellite has a simple digital filter detector which determines when the received signal from the laser is on or off. The communicated binary signal is converted to +1 or −1 and is input to the digital filter. A conventional sigma delta analog to digital converter comprising a sigma delta modulator and a digital filter is essentially split with the modulator modulating the input analog signal to be communicated in binary form and the digital filter residing with the receiver for data detection using the digital filter. The sigma-delta modulator and digital filter of the conventional sigma delta converter are placed at physically separated locations on opposing ends of the communication crosslink. The laser crosslink integrates the conventional sigma delta analog to digital converter to simplify the design of the laser crosslink. By changing the clock speed, order of the sigma delta modulator on the transmitting satellite, and the size of the decimating digital filter on the receiving satellite, any number of bits of resolution, up to the bit capacity of the laser cross link, can be realized. The link may operate at high resolution and low capacity or low resolution and high capacity. The laser crosslink enable adaptation for different types of data resolution and link capacities without requiring different hardware.

The laser crosslink may exist through free space or through optical fibers. The high bandwidth available from the laser crosslink permits the direct transmission of the oversampled data stream output by the sigma-delta modulator. Since that output is oversampled and redundant already, this eliminates the normally required synchronization and error correction detection on the digital link. Since the digital sample is reconstructed using a digital filter filtering a continuous stream of data, it is less susceptible to errors in the transmission of data than in traditional framed data where the probability of error for bits is the same but the effects of errors is more severe with the most significant bits than with the least significant bits.

The laser crosslink system can be used as a satellite communication system employing free space or fiber optic laser crosslink where digitized information such as voice, received radio signals is being transmitted to another location or satellite. One application of small satellites is a constellation of satellites containing signal receivers using nanosatellites. The digitized samples of the received signals to other satellites for processing over a laser crosslink. The laser crosslink can be used for other uses including signal intelligence collection, digital nonregenerative transponders, and fiber optics. The laser crosslink offers the collection of low bandwidth signals with high resolution at low power levels.

The laser crosslink is well suited for use in small satellites such as nanosatellites having very limited power resources. The laser crosslink has a reduced number of components reducing power requirements. One application of small satellites is a signal receiver that transmits digitized copies of the received signals to other satellites for processing. This has uses in either signal intelligence or for digital nonregenerative transponders. The laser crosslink offers lower power consumption and fewer parts by integrating a modulator and A/D converter with the transmitter and receiver. The laser crosslink reduces filter requirements for small satellites using direct modulation of a laser while reducing manufacturing tolerances for smaller satellites. No specialized modulator is required by the laser. No error correction is required because redundancy is added by the over sampling of the sigma delta converter. No synchronization is needed between the two satellites because the output of the digital filter may be sampled at any time to reconstruct signal samples. No framing is needed in the data stream because the data stream is self-synchronizing. Also, there is no need to order bits from most to least significant bits as in traditional digital data links because only the duration of the bit time is required for proper data detection. These and other advantages will become more apparent from the following detailed description of the preferred embodiment.

DETAILED DESCRIPTION OF THE PREFERRED EMBODIMENT

Figure 2:
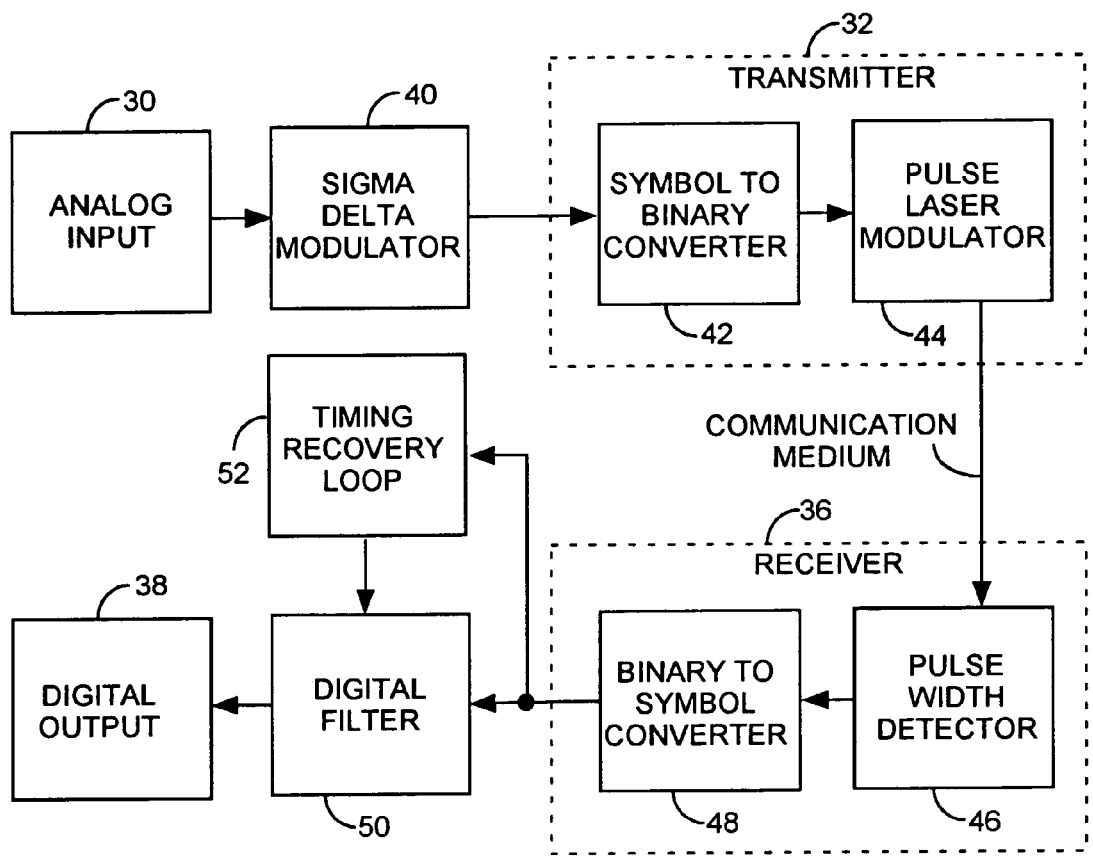
FIG. 2 is a block diagram of a laser communication system.

An embodiment of the invention is described with reference to the figures using reference designations as shown in the figures. Referring to FIG. 2, a laser communications crosslink system receives an analog input 30 for communication as a communication signal from a transmitter 32 through a communication medium to a receiver 36 that provides a digital output 38 representing the analog input signal 30. The digital output 38 is an n bit sample of the analog input 30. The analog input 30 is modulated by the sigma delta modulator 40 for providing +/−1 binary symbols that are communicated as binary zero and one digital signals. The communication medium maybe a free space satellite or terrestrial laser crosslink or fiber optic cable. The input signal 30 is modulated by a sigma delta modulator 40 providing a +/−1 modulated input signal to the transmitter for transmission from the transmitter 32 over a communication medium. The +/−1 modulated output of sigma delta modulator is received by the transmitter 32. The sigma delta modulator 40 produces pulse width modulated symbols representative of the analog input signal 40. The transmitter 32 includes a symbol to binary converter 42 and a pulse laser modulator for converting and pulse width modulating the modulated signal from the sigma delta modulator 40. The symbol to binary converter 42 converts analog voltages of the modulated signal from the sigma delta modulator 40 into binary values of on or off states. The symbol to binary converter 42 converts the +/−1 symbols to binary output of 0 or 1. The binary output of zero and one values is the input to the pulse laser modulator 44 that turns on or off a laser pulse depending upon whether a 0 or 1 is input value. The pulse laser modulator 44 transmits binary values across communication medium to the receiver 36. The laser pulses are communicated over the communications medium 34 as the communications signal.

The receiver 36 includes a pulse width detector 46 and a binary to symbol converter 48. The receiver 36 receives the communication signal and detects the laser pulse widths and outputs a digital symbol signal to a timing recover loop 52 and a digital filter 50 that provides the digital output 38. The pulse width detector 46 in the receiver detects the duration of laser pulses of the communicated signal and provides binary values. The laser pulses are received by the pulse width detector 36 in the receiver 34 and outputs a binary value one for the duration of the communicated laser pulse. The binary to symbol converter 48 changes the binary output 0 or 1 from the detector 36 into +/−1 output symbols. The binary to symbol converter 48 converts binary values from the pulse width detector 46 into the +/−1 binary symbols. The +/−1 output symbols are communicated to the digital filter 50 and the timing recovery loop 52 for generating a digital output 38 having a value representing the analog signal at corresponding symbol times. The digital filter 50 is a circuit that filters the binary symbols signal and provides the digital output signal clocked by the timing recover loop 52. The timing recovery loop 52 is a circuit that recovers the sample times for clocking the digital filter 50. The timing recovery loop 52 recovers from the symbol output a sample rate to provide a clock signal to the digital filter 50 for clocking the digital output signal 38. The digital output 38 is an n bit digital sample of the analog input dependant upon the length and wordsize of the digital filter.

Figure 1A:
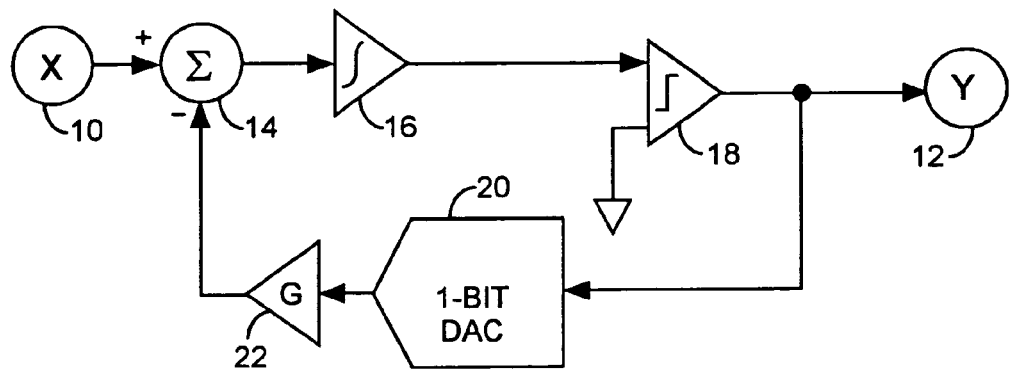
FIG. 1A is a schematic diagram of a first order sigma delta modulator.
Figure 1B:
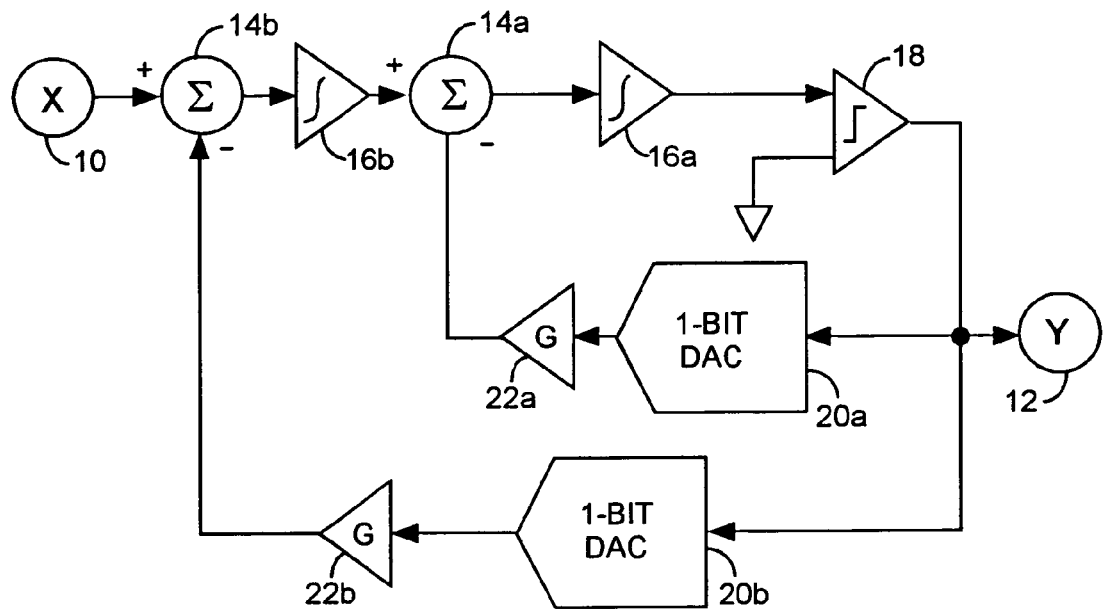
FIG. 1B is a schematic diagram of a second order sigma delta modulator.

The sigma delta modulator 40 can be a first order sigma delta modulator shown in FIG. 1A or a second order sigma delta modulator shown in FIG. 1B. Additional integrators 16 and DACs 20 may be used to increase the order of the loop of the sigma delta modulator. By increasing the order of the loop, the magnitude of the error of the binary symbol output 12 of the sigma delta modulator 40 is reduced. By increasing the order of the sigma delta modulator 40, the sampling rate of the output symbol signal 12 is reduced and the error signal is reduced thereby reducing the required transmission bandwidth over the communication channel. The oversampling of the sigma delta modulator 40 and a corresponding amount of oversampling by the digital filtering 50 provide a form of forward error correction. By increasing the amount of oversampling at the output of the sigma delta modulator 40, the overall errors in the digital output 38 maybe reduced. Additional forward error correction can be realized by oversampling.

The transmitter 32 may further transmit a laser timing signal that is in synchronism with the communicated pulse width modulated laser signal. The pulse width detector 46 could be modified to further detect the laser timing signal for generating a timing signal communicated to the digital filter 50 without the need for a separate timing recovery loop. The size of the digital filter 50, the order of the sigma delta modulator 40 and the sample rates determine the complexity, effective numbers of quantization bits, sampling errors, and bandwidth needed for the laser communication crosslink system. The pulse laser modulator 44 may be an on off shift keying or phase shift keying laser modulator. When the pulse laser modulator 44 is a phase shift keying laser modulator, transmitter 32 may be operated without the symbol to binary converter 42. When the communication signal is a phase shift keying signal, the pulse width detector 36 is a phase detector providing the symbol signal directly to the digital filter 50 without the use of the binary to symbol converter.

The receiver 36 may be modified to provide quantized sampled levels for each received pulse. For received pulse quantization, the pulse width detector 46 is replaced with an n bit pulse amplitude quantizer and the binary to symbol converter 48 is replaced with an n bit symbol converter 48 with multiple $2^n$ values between +/−1 to enable inherent filtering by the digital filter 50 performing soft decision error correction.

The laser communication crosslink system is preferably used for communicating analog signals in digital form. The laser communication crosslink system need not use parallel to serial conversion, frame synchronization, data reclocking, nor forward error correction. An analog signal may be communicated over the communication medium in digital form for recovering a digital value of the analog signal. Those skilled in the art can make enhancements, improvements, and modifications to the invention, and these enhancements, improvements, and modifications may nonetheless fall within the spirit and scope of the following claims.

What is claimed is:

1. A system for communicating an analog input signal as a modulated binary laser signal over an optical communication medium recovered as a digital output signal, the system comprising,
  a sigma delta modulator for receiving the analog input signal and modulating the analog signal into a modulated symbol signal,
  a transmitter for converting the modulated symbol signal into the modulated binary laser signal, and for transmitting the modulated binary laser signal over the optical communication medium, the modulated binary laser signal having a pulse width having a duration representative of the analog input signal,
  a receiver for receiving and detecting the pulse width of modulated binary laser signal for providing a received symbol signal, and
  a digital filter for filtering the symbol signal into the digital output signal,
  wherein the transmitter comprises,
  a symbol to binary converter for converting the modulated symbol signal from the sigma delta modulator into a converted digital signal, and
  a pulse width modulator for modulating the laser signal by the converted digital signal into the modulated binary laser signal as a pulse width binary modulated laser signal communicated over the optical communication medium.

2. The system of claim 1 wherein the receiver comprises,
  a pulse width detector receiving the pulse width modulated binary laser signal and for providing a detected binary signal, and
  a binary to symbol converter for converting the detected binary signal into the received symbol signal.

3. The system of claim 2 wherein,
  the pulse width detector is a pulse width quantizer detector, the detected binary signal is a detected quantized signal, and
  the binary to symbol converter converts the detected quantized signal into the received symbol signal.

4. The system of claim 2 wherein the receiver comprises,
  a pulse width detector for detecting the pulse width of the modulated binary laser signal laser pulses of the communicated signal and provides binary values,
  a binary to symbol converter for changing the binary values from the pulse width detector into symbols, the digital filter for filtering the symbols for providing a clocked digital output signal, the digital filter filtering a continuous stream of symbols.

5. The system of claim 4 further comprising,
  a timing recovery loop for receiving the symbols and for clocking the digital filter for providing the clocked digital output signal.

6. The system of claim 5 wherein,
  the timing recovery loop recovers from the symbols a sample rate to provide a clock signal to the digital filter, and
  the clocked digital output is an n bit digital sample of the analog input signal, the digital filter filtering a continuous stream of symbols.

7. The system of claim 6 wherein,
  the system does not use parallel to serial conversion, frame synchronization, data reclocking, forward error correction, or significant bit reordering for generating the clocked digital output signal.

8. The system of claim 1 further comprising,
  a timing recovery loop for generating a timing signal from the receive symbol signal for clocking the digital filter.

9. The system of claim 1 wherein,
  the sigma delta modulator is a first order sigma delta modulator.

10. The system of claim 1 wherein,
  the sigma delta modulator is a second order sigma delta modulator.

11. The system of claim 1 wherein the optical communication medium is selected from the group consisting of free space and a fiber optic.

12. The system of claim 1 wherein the modulated binary laser signal is communicated over the optical communication medium without the use of frame words.

13. The system of claim 1 wherein,
  the modulated binary laser signal is a pulse having a pulse width indicating the analog input signal, and
  the pulse is a laser pulse communicated over the optical communication medium.

14. A system for communicating an analog input signal as a pulse width modulated binary laser signal over an optical communication medium recovered as a digital output signal, the system comprising
  a sigma delta modulator for receiving the analog input signal and modulating the analog signal into a modulated symbol signal,
  a transmitter for converting the modulated symbol signal into a converted digital signal for pulse width modulating a laser signal into the pulse width modulated binary laser signal, and for transmitting the pulse width modulated binary laser signal over the optical communication medium, the modulated binary laser signal having a pulse width having a duration representative of the analog input signal, the modulated binary laser signal being transmitted through the optical communication medium,
  a receiver for receiving and detecting the pulse width of the pulse width modulated binary laser signal to provide a detected binary signal and for converting the detected binary signal into a received symbol signal, and
  a digital filter for filtering the symbol signal into the digital output signal,
  wherein the receiver comprises,
  a pulse width detector for detecting the duration of the pulse width of the modulated binary laser signal laser pulses of the communicated signal and provides binary values, and a binary to symbol converter for changing the binary values from the pulse width detector into symbols, the digital filter for filtering the symbols for providing a clocked digital output signal.

15. The system of claim 14 further comprising, a timing recovery loop for clocking the digital filter for providing the clocked digital output signal, wherein, the timing recovery loop recovers from the symbols a sample rate to provide a clock signal to the digital filter, and the clocked digital output is an n bit digital sample of the analog input signal.

16. The system of claim 15 wherein, the system does not use parallel to serial conversion, frame synchronization, data reclocking, forward error correction, or significant bit reordering for generating the clocked digital output signal.

17. The system of claim 14 wherein the modulated binary laser signal is communicated over the optical communication medium without the use of frame words.

18. The system of claim 14 wherein the optical communication medium is selected from the group consisting of free space and a fiber optic.

* * * * *